Nov. 19, 1929.  H. S. BENJAMIN  1,736,185
HEIGHT MEASURING APPARATUS
Filed Feb. 25, 1927  5 Sheets-Sheet 1

Fig.1.

Inventor
Harry S. Benjamin,
By
Attorneys

Nov. 19, 1929.  H. S. BENJAMIN  1,736,185
HEIGHT MEASURING APPARATUS
Filed Feb. 25, 1927   5 Sheets-Sheet 4

Inventor
Harry S. Benjamin,
Attorneys

Fig. 8.

Inventor.
Harry S. Benjamin,

Patented Nov. 19, 1929

1,736,185

UNITED STATES PATENT OFFICE

HARRY S. BENJAMIN, OF DETROIT, MICHIGAN

HEIGHT-MEASURING APPARATUS

Application filed February 25, 1927. Serial No. 170,770.

The present invention pertains to a novel apparatus for measuring the height of persons and is adapted for association with a scale, although it need not necessarily be used in this relation.

Height measuring devices at present in use involve a bar which is adjusted upon the head of the individual and thus require that the hat of the user be removed. This method is awkward and uncomfortable because of the weight of the bar resting on the head of the person to be measured. Moreover, such a device requires a graduated standard on which the bar slides; and since this standard cannot easily be concealed, this system does not lend itelf to use in a coin-controlled height measuring machine.

The present invention provides primarily a machine which may be readily operated by a coin and which makes use of a simpler and more convenient adjustment to the height of the individual. The apparatus of the invention comprises a vertically slidable member carrying a sight spot visible through a window in the housing of the machine. This spot is so arranged that it cannot be properly seen until the vertically movable member has been adjusted to the elevation of the horizontal line of sight of the person to be measured. The movable member also carries a rotatable data card geared to a fixed element of the mechanism in such a manner that it brings into reading position a table bearing information relative to the height to which the sight spot is adjusted. The table is obviously corrected to account for the distance between a person's line of sight and the top of his head. The relevant portion of the card is positioned behind an opening in a curtain also carried by the movable member, but between the opening and the card is a shutter which conceals the information until a coin is deposited.

The machine requires no platform or stand and, in taking measurement from the line of sight rather than from the top of the head, permits a reduction in apparatus and material at the upper end as well as at the lower end, the result of which is that the size and mass of the machine are considerably reduced.

On deposit of a coin in the machine certain mechanism comes into play for withdrawing the shutter from the relevant portion of the card so that the latter may be read. This mechanism is constructed to lock the shutter again in obscuring position when the sight spot is readjusted by a subsequent user. The various parts are thus brought into position for showing the information concerning the height of such subsequent user, the shutter however being locked in obstructing position until another coin is inserted.

The invention is fully disclosed in the following description and in the accompanying drawings, in which—

Reference to these views will now be made by use of like characters which are employed to designate corresponding parts throughout.

Figure 7:
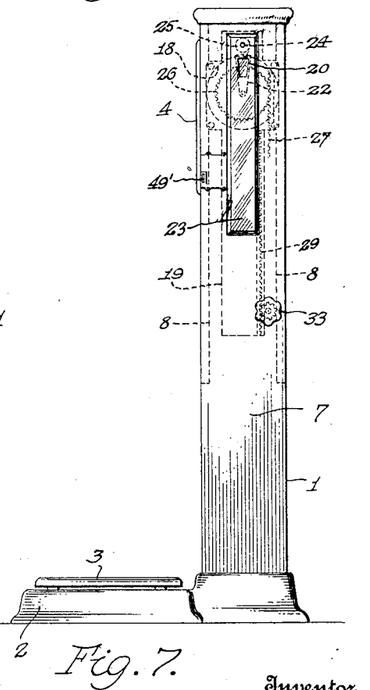
Fig. 7 is a side elevation of a scale equipped with the invention.

The device of the invention is preferably used in conjunction with a weighing scale and of the type shown in Figure 7, comprising a vertical column or hollow enclosure 1, a supporting base 2 and a weighing platform 3 which controls the weighing mechanism inside the housing 1 in any suitable or known manner. The front wall of the housing 1 is fitted with a glass 4 behind which is a dial 5 and a cooperating pointer 6, as shown in Figure 8, associated with the weighing mechanism.

Figure 8:
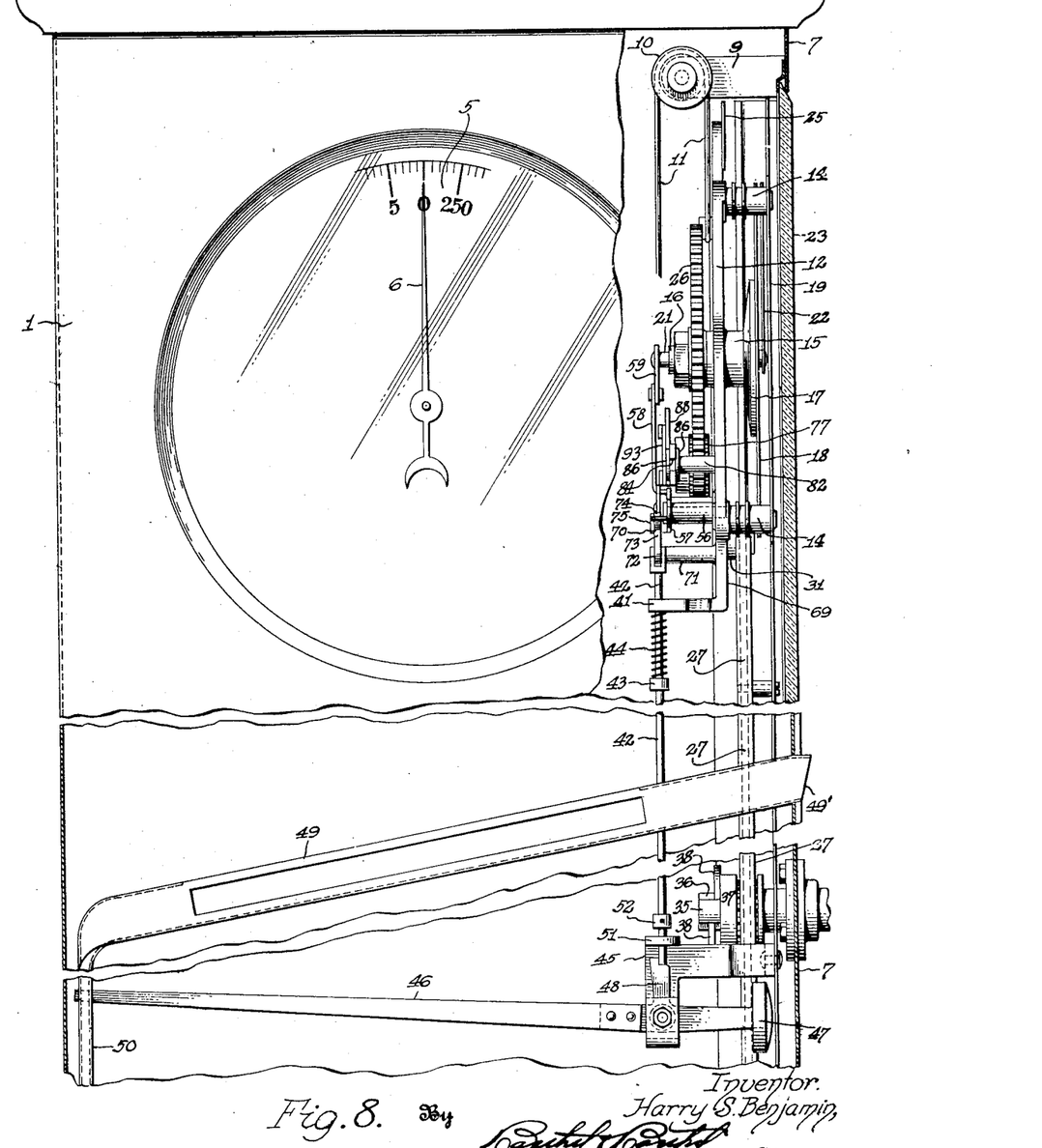
Fig. 8 is a fragmentary front elevation of the scale with parts broken away to show a side elevation of the height measuring apparatus.

The height measuring apparatus constituting the present invention is arranged at one end of the casing adjacent the lateral wall 7 thereof as also shown in Figs. 7 and 8. For the support and operation of the mechanism, the front and rear walls of the housing 1 are equipped with vertical rails 8. A bracket 9 projects inwardly from the wall 7 and carries a pulley 10, over which is passed a cord or cable 11. Between the rails is mounted a spider 12 fastened as at 13 to one end of the cable 11 and provided with several rollers 14 engaging the rails 8. The remaining end of the cable 11 is provided with a suitable spring or weight (not shown) to counterbalance the spider 12 and parts associated therewith.

Figure 1:
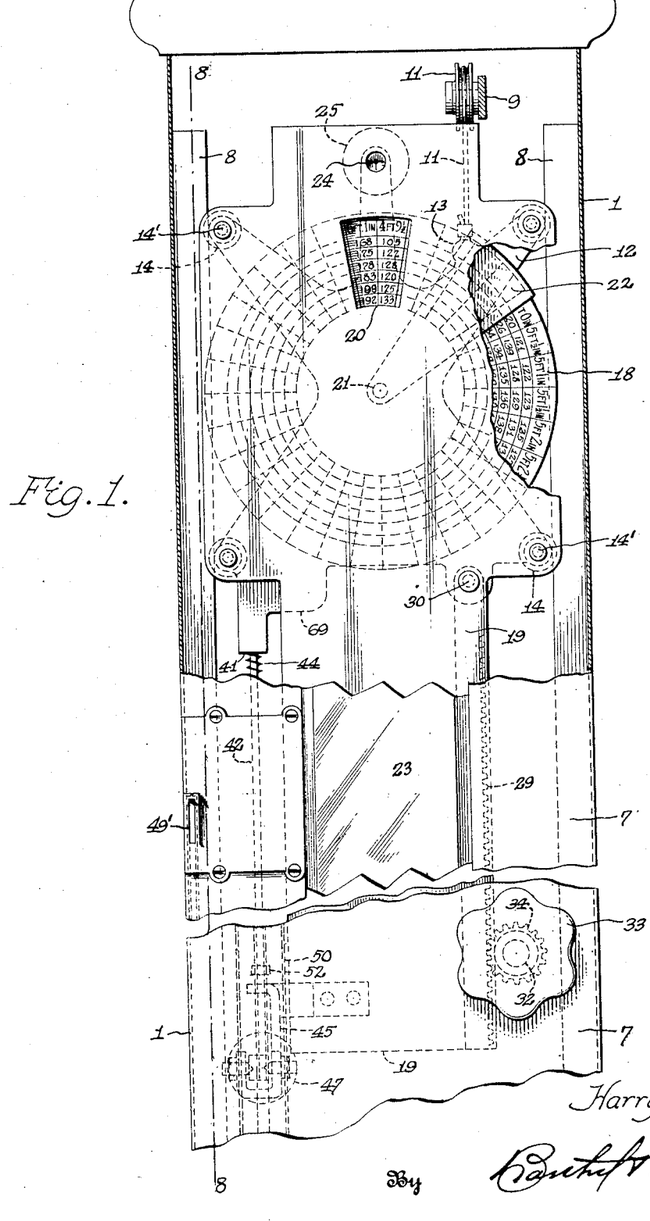
Figure 1 is a fragmentary front elevation of the apparatus, parts being broken away for the purpose of illustration.
Figure 3:
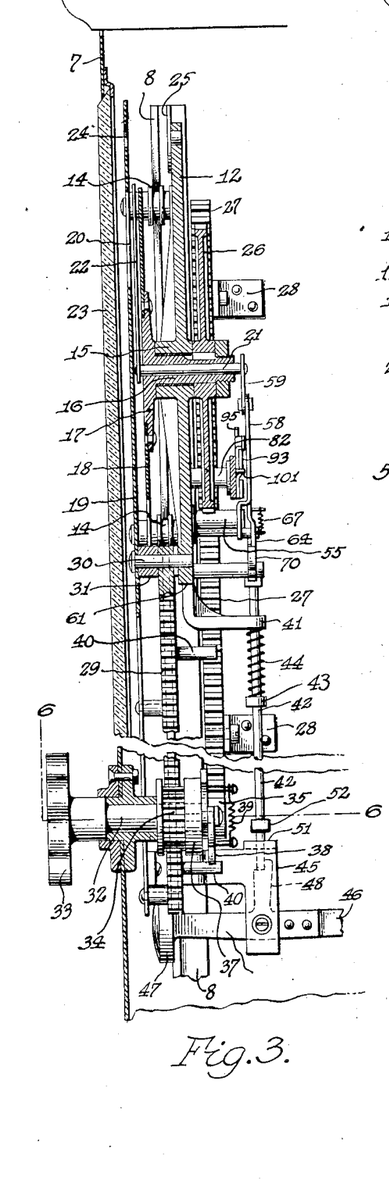
Fig. 3 is a section on the line 3—3 of Figure 2.

The spider has a central hub 15 (Figure 3) in which is received a sleeve 16 having at its outer end, a disk 17. The member 17 carries an annular plate 18 having inscribed thereon data concerning the height and the corresponding weight for ladies and men in the manner shown in Figure 1. The data is arranged in radial columns each headed by a different height beneath which is shown the corresponding weight for men and women. The pins 14' which carry the rollers 14 also support a sheet or curtain 19 positioned between the wall 7 and the spider. The sheet 19 has a slot 20 adapted to expose the upper part of the disk 18 under certain conditions, but through the sleeve 16 is passed a stem 21 carrying a shutter 22 which may be positioned directly behind the slot 20 for obstructing the view of the disk 18.

The wall 7 has a glass window 23 adjacent the curtain 19, and the latter has a sight opening 24 near its upper edge, through which may be seen a colored disk 25 fixed to the upper part of the spider.

Keyed to the sleeve 16 is a gear 26 adapted to ride on a vertical rack 27 secured to the casing by suitable brackets 28. A short rack 29 is secured between the members 12 and 18 by a pin 30 passed through these parts. The rack is properly spaced from the sheet or curtain 19 by a collar 31 and lies near the edge of the sheet or curtain 19 opposite the first named rack 27.

For the purpose of moving the sheet 19 and associated parts up and down, a stub shaft 32 is journaled in the wall 7 adjacent the rack 29 and is equipped with an exterior knob 33 and a loosely mounted gear 34 meshing with the rack. The shaft carries a double cam formed by a disk 35 having two notches 36. A larger disk 37 loosely mounted on the shaft is fixed to the gear and has pivoted thereto a pair of pawls 38 adapted for the reception of notches and cooperation otherwise with the cam surfaces. A small spring 39 connects the two pawls and draws them together against the cam. On rotation of the shaft in either direction, one of the pawls will be locked by the cam, whereby the gear will turn with the shaft and slide the rack. When the rack 29 reaches a predetermined upper or lower limit the leading pawl, i. e., the pawl pushed by a cam shoulder, is engaged by one of the stop pins 40 on the rack and thereby released from its notch so that continued turning of the shaft in the same direction will merely be idle with respect to the gear and rack. Thus, the sheet 19 and parts carried thereby are permitted to be moved only between certain limits, and an attempt to force them beyond these limits will not jam or break any of the parts.

It will be apparent that vertical movement of the spider by the means already described causes the data sheet or disk 18 to be rotated through the engagement of the gear 26 with the fixed rack 27. The person whose height is to be measured standing on the floor alongside the casing and its platform, turns the knob until he can see the center of the disk 25 through the aperture 24 in a horizontal line of sight. The various parts are so adjusted that in this position the particular information on the plate 18 concerning the person using the machine is disposed directly behind the slot 20. Until a coin is inserted, the shutter 22 conceals this information. The mechanism for removing the shutter and accomplishing associated operations will now be described.

The lower edge of the spider 12 is formed at a corner with a horizontal ring 41 through which a slidable locking rod 42 is passed. The rod carries a fixed collar 43 between which and the member 41 is mounted an expansion spring 44 surrounding the rod and thereby tending to press it downwardly. Near the lower end of the rod a bracket 45 is fixed to the wall 19 for supporting a balanced lever 46. One end thereof extends to the opposite wall of the housing, and the other end carries a weight 47 which balances the lever despite the fact that one arm thereof is considerably longer than the other. The lever is formed near its fulcrum with a finger 48 on which the lower end of the rod 42 normally rests, thereby resisting the downward pressure of the spring 44.

A coin chute 49 is disposed within the housing in a plane perpendicular to that of the front wall 7, and has its entrance end 49' exposed through this wall and its other end formed with a depending portion 50 into which the inner end of the lever 46 enters. A coin of proper denomination passing through the chute 49 strikes the lever 46 and overbalances the weight 47 whereby the finger 48 is removed from the rod 42 and the latter is allowed to drop under the action of the spring 44. The bracket 45 is formed at its upper end with a ring 51 also guiding the rod 42 and serving as a stop engageable by a collar 52 on the rod, whereby the downward movement of the rod is limited.

The spider 12 is provided near one of its lower corners with a pair of studs 55 and 56 at different elevations and suitably formed to accommodate a slide 57 having slots 55' and 56' which receive the studs. The inner end of the slide is formed with an upstanding arm 58 joined by a link 59 to the spindle 21, whereby the shutter 22 is controlled by the movement of the slide. The opposite lower corner of the spider has an upwardly turned ear 60 joined by a spring 61 to the nearer end of the slide and thereby tending to pull the slide in the direction which causes the shutter 22 to be moved away from the exposure opening 20.

To the slide 57 is pivoted a cam lever 62 by means of a pin 63. The free upper corner of the member 62 is normally engaged by a detent 64 also pivoted to the slide and provided near the pivot pin 65 with an offset finger 66 adapted to pass the adjacent corner of the member 62 under certain conditions presently to be described. The members 62 and 64 are normally drawn together into locking relation by means of a spring 67 attached to both these parts. Downward movement of the member 62 is limited by a pin 68 carried by the slide.

The corner 69 of the spider adjacent the upper end of the rod 42 has a retaining lever 70 pivoted thereto by a pin 71. The upper end of the rod 42 is pivoted as at 72 to one end of the lever 70, which end is also formed with a heel 73 engageable by a latch 74 pivoted to the slide by a pin 75.

Figure 2:
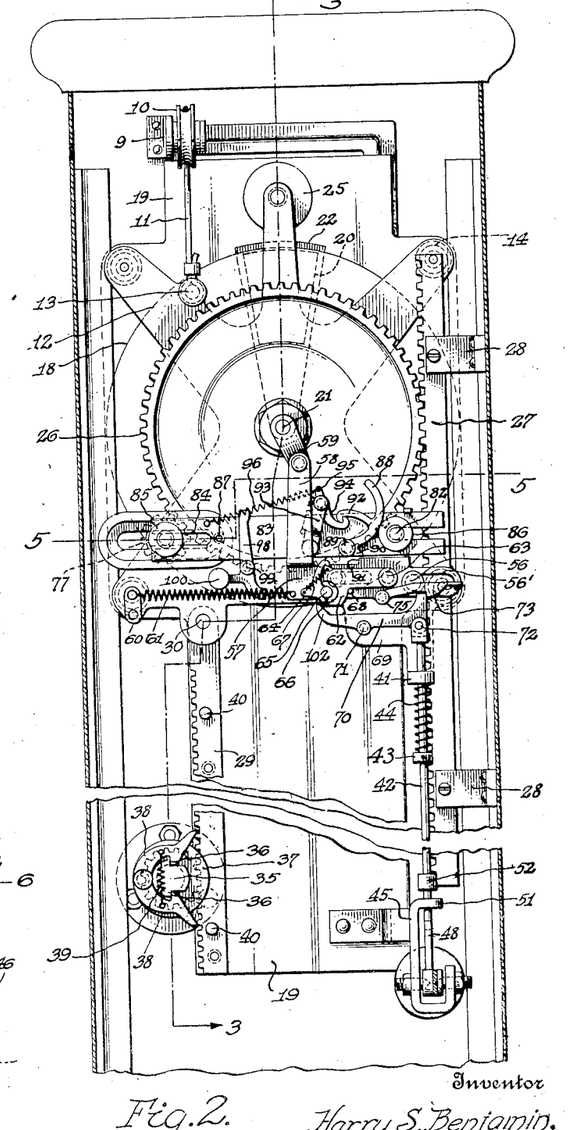
Fig. 2 is a vertical longitudinal section of the apparatus, taken directly behind the front wall of the enclosure.

The latch normally engages the heel 73, as shown in Figure 2, thereby retaining the slide and consequently the shutter against the tension of the spring 61, until the rod 42 is allowed to drop when tripped by a coin in the manner already described.

Figure 4:
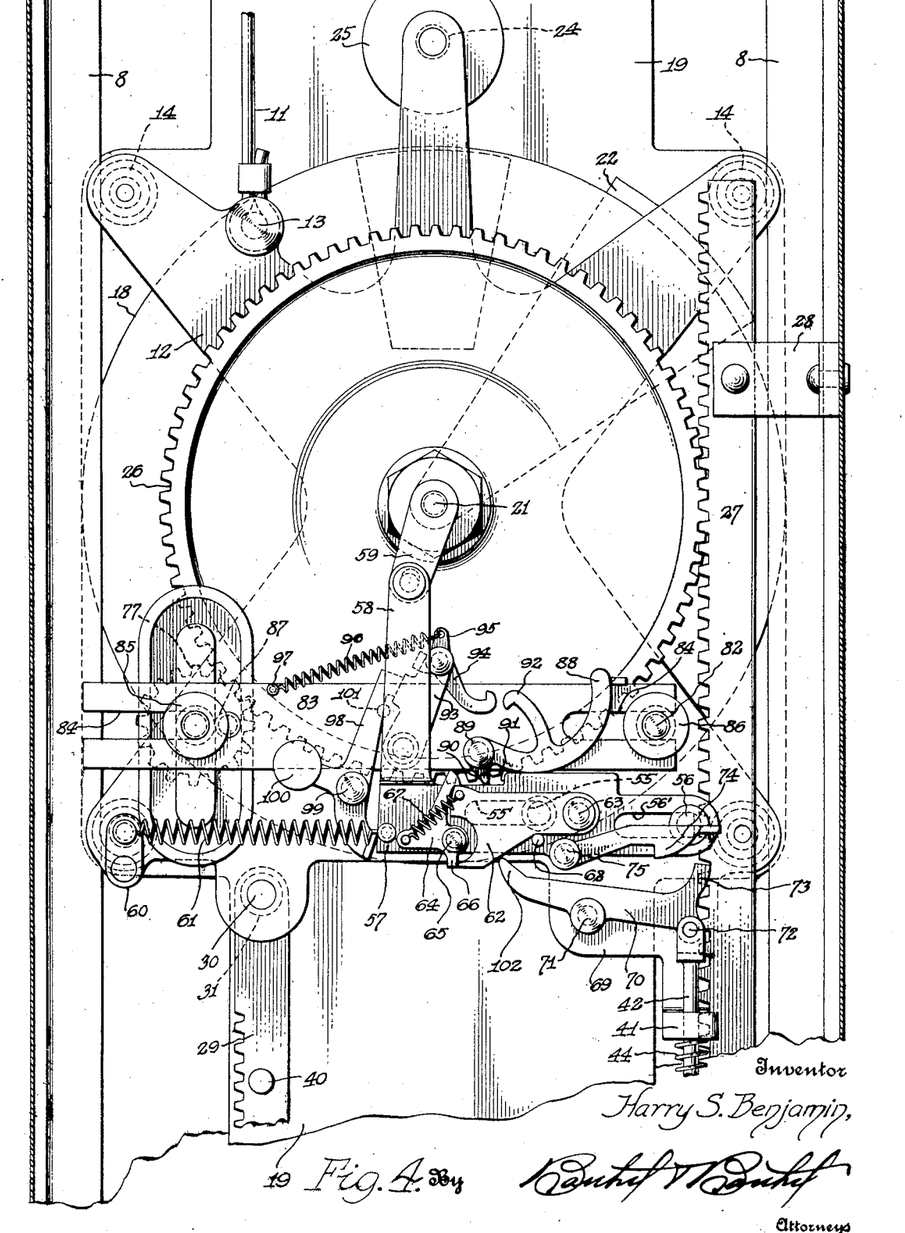
Fig. 4 is an enlarged detail of Figure 2.
Figure 5:
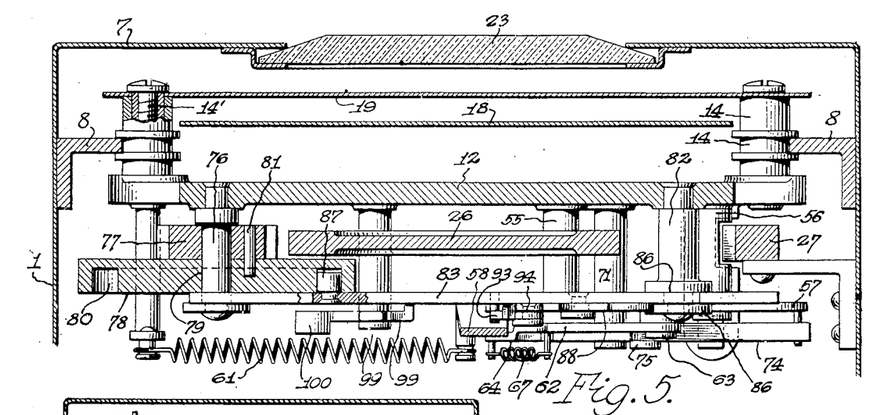
Fig. 5 is a section on the line 5—5 of Figure 2.
Figure 6:
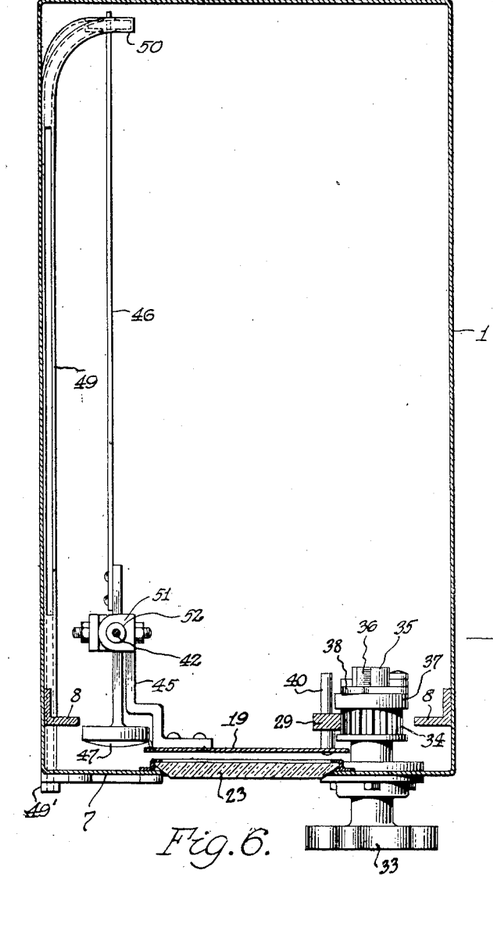
Fig. 6 is a section on the line 6—6 of Figure 3.

As shown more clearly in Figures 4 and 5, the spider carries at one of its lower corners a stub shaft 76 on which is loosely mounted a pinion 77 meshing with the gear 26. The stub shaft further carries an elongated member 78 having a longitudinal slot 79 through which the stub shaft is passed and also a peripheral groove 80. A pin 81 is driven through the pinion 77 and into the member 78 in order to lock these parts together so that they will revolve in unison on the stub shaft. The other lower corner of the spider carries a stud 82 which, in conjunction with the member 76 supports an upper slide 83. The slide has a slot 84 in each end, and the two slots receive the members 76 and 82. One end of the slide is received between the member 78 and a head 85 on the member 76, while the other end is received between parallel head members 86 on the stud 82. The slide carries a roller 87 received in the groove 80 as clearly shown in Figure 5.

Further, the upper slide 83 carries a curved arm 88 pivoted thereto by a pin 89 and adapted to ride on one of the heads 86 of the stud 82. This arm is provided near its pivoted end with a tooth 90 received in a notch 91 in the upper edge of the lower slide, and is provided intermediate its ends with a hook 92, the purpose of which will presently appear. To the upper slide 83 is also pivoted an arm 93 carrying at its upper end a pivoted hook 94 adapted to lock with the member 92 as illustrated in Figure 2. The blank end 95 of the hook 94 is connected by a spring 96 to a pin 97 on the slide 83, thereby normally urging the hooked end in the direction of the member 92.

A trip lever 98 is pivoted on the spider by a pin 99 and lies in the path of the arm 93 when the latter is moving with the slide. This lever has a weight 100 which readily over-balances the lever to the position shown in Figure 2 when engaged by the arm. Movement of the arm under the influence of the spring 96 is limited by a pin 101 on the slide.

The adjustment of the data sheet with reference to the altitude of the sight hole has already been described. The tripping of the rod 42, resulting in its engagement of the latch 74 from the heel 73, has also been mentioned. The spring 61 now draws the lower slide 57, causing the parts 64 and 62 to ride successively over the tip 102 of the retaining lever 60. In this movement, the offset finger 66 is first engaged by the tip 102, whereby the member 64 is drawn away from the upper corner of the member 62 which is now free to rise under the action of the tip 102. If the final position of the upper slide 83 has brought the tooth 90 into the path of the wall of the notch 91, the hook 92 will be released from the hook 94 as shown in Figure 4. When the cam lever 62 has moved sufficiently away from the tip 102, the spring 67 will return the parts 62 and 64 to the locked position shown in Figure 4.

The next person using the machine will cause the gear 26 to rotate by the means already mentioned. The slightest movement of the gear, to bring another section of the data card 18 behind the slot 20, will turn the pinion 77 through at least a half revolution which is sufficient to impart a complete throw to the upper slide 83. Such movement of the upper slide 83 will bring the arm 93 into contact with the trip lever 98 whereby the hooks 93 and 94 will be operated, if this has not already been done, thereby letting the tooth 90 drop into the groove 91. This tooth will then engage the wall of the slot 91 and pull the lower slide 57 in the direction of the heel 73 of the retaining lever 70. The cam 62 now locked by the detent 64 presents a non-yielding edge to the tip 102, so that the above mentioned movement of the lower slide raises the heel 73 into engagement with the latch 74 to lock the lower slide which, in this movement, has brought the shutter 22 behind the slot 20.

If the upper slide 83 is caused to take the extreme position shown in Figure 2, the curved arm 88 will ride on the head 86 to lock the hooks 92 and 94 together and thus hold the tooth 90 out of the way of the lower slide.

The insertion of a coin by the second user trips the heel 73 and allows the lower slide 57 to be pulled by the spring 61. During this movement, the lower slide engages the lower end of the trip lever 98 and brings the upper end thereof nearer the arm 93. If this arm is not already within reach of the lever, the next adjustment of the upper slide will cause contact between these parts to release the hooks 92 and 94 and bring the tooth 90 into the notch 91 so that the tooth may return the lower slide to its locked engagement with the heel 93.

It will be seen that the peculiar construction and relation of the parts 62 and 64 allows them to pass the tip 102 in one direction but to present a firm cam face thereto when moving in the other direction, whereby to bring the heel 73 into its locked position.

Also a specific embodiment of the invention has been illustrated and described, and it will be apparent that various alterations in the details of construction may be adopted without departing from the scope of the invention as indicated by the appended claims.

What I claim is:—

1. A height measuring apparatus comprising a vertically movable member, having a sight spot movable therewith, a data device movable with said member, and means for moving said data device relatively to said member on movement of the latter, whereby to bring into reading position a section of said data device having indicia corresponding to the height to which said spot is adjusted.

2. A height measuring apparatus comprising a vertically movable member, a sight spot carried thereby, a data card carried by said member, and means for moving said card relatively to said member on movement of the latter, whereby to bring into reading position a section of said card corresponding to the height to which said spot is adjusted.

3. A height measuring apparatus comprising a vertically movable member, a sight spot carried thereby, a movable data device movable bodily with said movable member, and means operatively connected to said data device for turning the same relative to the vertical movement of each movable member, whereby to bring into reading position a section of said data device corresponding to the height to which said spot is adjusted.

4. A height measuring apparatus comprising a vertically movable member, a sight spot carried thereby, a data card rotatably attached to said movable member, and a fixed rack geared to said card, whereby to bring into reading position a section of said card corresponding to the height to which said spot is adjusted.

5. A height measuring apparatus comprising a vertically movable member, a data card movable bodily with said member, a slotted curtain movable with said member and adapted to expose a section of said card, and means for moving said card relatively to said curtain and member on movement of the latter, whereby to bring into reading position opposite said slot a section of said card having data corresponding to the height to which said curtain is adjusted.

6. A height measuring apparatus comprising a vertically movable member, a sight spot carried thereby, a data card carried by said member, a slotted curtain carried by said member and adapted to expose a section of said card, and means for moving said card relatively to said member on movement of the latter, whereby to bring into reading position a section of said card corresponding to the height to which said spot is adjusted.

7. A height measuring apparatus comprising a vertically movable member, a sight spot carried thereby, a data card rotatably attached to said movable member, a slotted curtain carried by said member and adapted to expose a section of said card, and a fixed rack geared to said card, whereby to bring into reading position a section of said card corresponding to the height to which said spot is adjusted.

8. A height measuring apparatus comprising a vertically movable member, a sight spot carried thereby, a data card carried by said member, a slotted curtain carried by said member and adapted to expose a section of said card, means for moving said card relatively to said member on movement of the latter, whereby to bring into reading position a section of said card corresponding to the height to which said spot is adjusted, a shutter mounted directly behind the slot in the curtain, and coin-controlled means for actuating said shutter.

9. A height measuring apparatus comprising a vertically movable member, a sight spot carried thereby, a data card carried by said member, a slotted curtain carried by said member and adapted to expose a section of said card, means for moving said card relatively to said member on movement of the latter, whereby to bring into reading position a section of said card corresponding to the height to which said spot is adjusted, a shutter mounted directly behind the slot in the curtain, a spring tending to withdraw said shutter from said slot, and coin-controlled locking means holding said shutter against the action of said spring.

10. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, and coin-controlled means for actuating said shutter.

11. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, a spring tending to withdraw said shutter from said slot, and coin-controlled locking means holding said shutter against the action of said spring.

12. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted opposite the slot in the curtain, a slide on said movable member and controlling said shutter, a lock for holding said slide, and coin-controlled means for releasing said lock.

13. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, a slide on said movable member and controlling said shutter, a lock for holding said slide, coin-controlled means for releasing said lock, and means tending to move said slide to open said shutter.

14. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, a slide on said movable member and controlling said shutter, a lock for holding said slide, coin-controlled means for releasing said lock, and a second slide carried by the movable member and adapted to bring the first named slide towards said lock.

15. A height measuring apparatus comprising a vertically movable member, a sight spot carried thereby, a data card rotatably attached to said movable member, a slotted curtain carried by said member and adapted to expose a section of said card, means for moving said card to bring into reading position with relation to the slot in the curtain, a section of said card corresponding to the height to which said spot is adjusted, a shutter adapted to close the slot, an operating member on said movable member for controlling said shutter, a lock for holding said operating member, coin-controlled means for releasing said lock, and a second operating member actuated by the movable member and adapted to bring the first named operating member into locking position.

16. A height measuring apparatus comprising a vertically movable member, a sight spot carried thereby, a data card attached to said movable member, a slotted curtain carried by said member and adapted to expose a section of said card, means for bringing into reading position a section of said card corresponding to the height to which said spot is adjusted, a shutter mounted directly behind the slot in the curtain, a slide on said movable member and controlling said shutter, a lock for holding said slide, coin-controlled means for releasing said lock, an operative connection between the movable member and said slide for actuating the latter, and means carried by said slide for closing the lock.

17. A height measuring apparatus comprising a vertically movable member, a sight spot carried thereby, a data card attached to said movable member, a slotted curtain carried by said member and adapted to expose a section of said card, means for bringing into reading position a section of said card corresponding to the height to which said spot is adjusted, a shutter mounted directly behind the slot in the curtain, a slide on said movable member and controlling said shutter, a lock for holding said slide, coin-controlled means for releasing said lock, a spring tending to draw said slide to open said shutter, an operative connection between said movable member and slide for actuating the latter against the action of said spring, and means carried by said slide for closing said lock.

18. A height measuring apparatus comprising a vertically movable member, a sight spot movable therewith, a data card attached to said movable member, a shutter adapted to expose and obscure said card, a slide on said movable member and controlling said shutter, a lock for holding said slide, coin-controlled means for releasing said lock, and a cam carried by said slide and adapted to close said lock.

19. A height measuring apparatus comprising a vertically movable member, a sight spot movable therewith, a data card attached to said movable member, a shutter adapted to expose and obscure said card, a slide on said movable member and controlling said curtain, a lock for holding said slide, coin-controlled means for releasing said lock, a second slide geared to the movable member and adapted to bring the first named slide into said lock, an operative connection between said movable member and the second slide for actuating the latter, and means carried by the first named slide for closing said lock.

20. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, a slide on said movable member and controlling said curtain, a lock for holding said slide, coin-controlled means for releasing said lock, a spring tending to draw said slide to the open position with respect to said shutter, a second slide geared to the movable member and adapted to bring the first named slide into said lock, an operative connection between said movable member and the second slide for actuating the latter, and means carried by the first named slide for closing said lock.

21. A height measuring apparatus comprising a vertically movable member, a sight spot carried thereby, a data card rotatably attached to said movable member, a slotted curtain carried by said member and adapted to expose a section of said card, a fixed rack geared to said card, whereby to bring into reading position a section of said card corresponding to the height to which said spot is adjusted, a shutter mounted directly behind the slot in the curtain, a slide on said movable member and controlling said curtain, a lock for holding said slide, a coin-controlled means for releasing said lock, a spring tending to draw said slide to the open position with respect to said shutter, a second slide geared to the movable member and adapted to bring the first named slide into said lock, an operative connection between said movable member and the second slide for actuating the latter, means carried by the first named slide for closing said lock, and a cam carried by the first named slide and adapted to close said lock.

22. In a height measuring machine, a vertically movable member a sight spot carried thereby, a data card rotatably attached to said movable member, a slotted curtain carried by said movable member and adapted to expose a section of said card, a rack connected to move said card, a stub shaft, a gear loosely mounted on said shaft and meshing with said rack, locking means between said gear and shaft, and means provided at selected points on said rack for releasing said locking means.

23. In a height measuring machine, a movable member, a sight spot carried thereby, a data card rotatably attached to said movable member, a slotted curtain carried by said movable member and adapted to expose a section of said card, a rack connected to move said card, a stub shaft, a gear loosely mounted on said shaft and meshing with said rack, means rotatable with said shaft, pawls pivotally connected to said gear and adapted to lock against said cams, and pins provided at selected points on said rack and engageable by said pawls to remove the latter from the cams, whereby the connection between the gear and the shaft is broken.

In testimony whereof I affix my signature.

HARRY S. BENJAMIN.